June 26, 1951 — O. SCHARPF — 2,558,316
THERMOSTAT AND LIKE CONTROL INSTRUMENT HAVING SINGLE
MEANS FOR ADJUSTING SENSITIVITY AND REVERSING ACTION
Filed Aug. 28, 1950 — 2 Sheets-Sheet 1

Inventor
Otto Scharpf
By Dodge
Attorneys

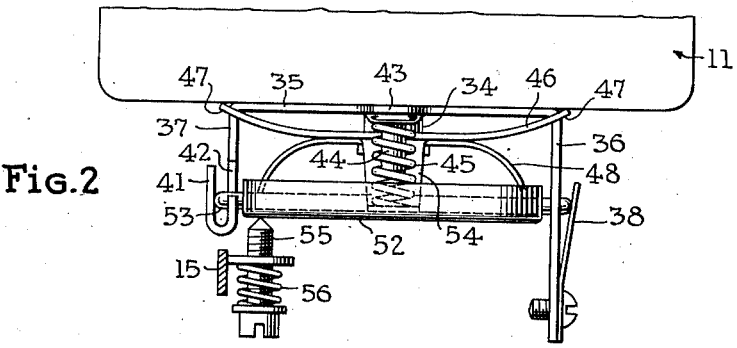
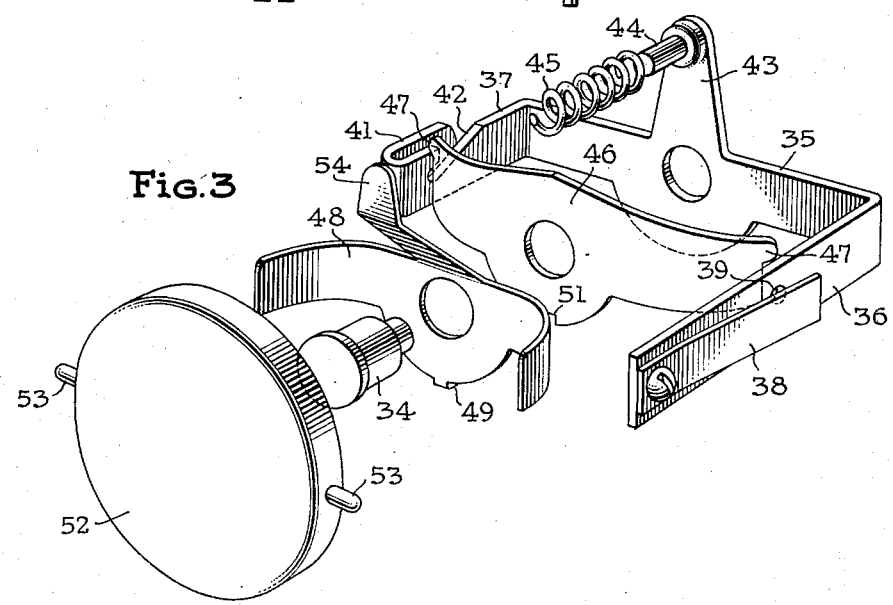
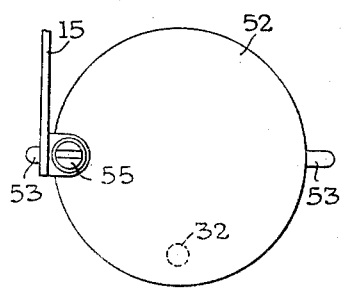
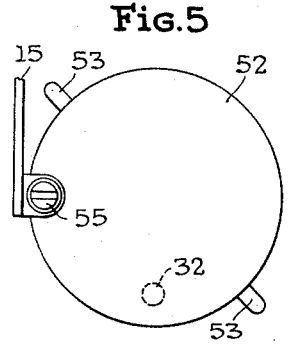
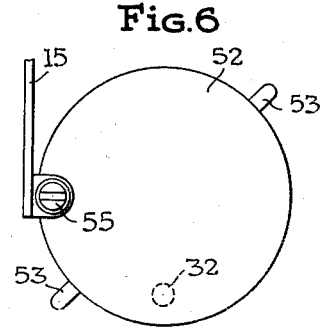

Patented June 26, 1951

2,558,316

UNITED STATES PATENT OFFICE 2,558,316

THERMOSTAT AND LIKE CONTROL INSTRUMENT HAVING SINGLE MEANS FOR ADJUSTING SENSITIVITY AND REVERSING ACTION

Otto Scharpf, Milwaukee, Wis., assignor to Johnson Service Company, Milwaukee, Wis., a corporation of Wisconsin Application August 28, 1950, Serial No. 181,806

7 Claims. (Cl. 74—99)

This invention relates to control devices such, for example, as thermostats, hygrostats and the like and affords a single device which may be adjusted to select different desired sensitivity ratios in two ranges, one of which produces what is known as "class-one" response and the other of which produces what is known as "class-two" response. To simplify discussion the description will refer to the invention as embodied in a thermostat, but general applicability to the control art is appreciated.

A class-one gradual-acting pneumatic thermostat is one in which the thermostat produces a rising branch line pressure in response to rising temperature. In other words, it is direct-acting. A class-two instrument of the same type is one which produces falling branch line pressure in response to rising temperature. In other words, it is reverse-acting.

Means to adjust the sensitivity ratio are not broadly new, but so far as applicant is aware the mechanisms used are not capable of inclusion in a class-reversing mechanism. Similarly thermostats have been devised which can be set to operate as class-one or class-two instruments selectively, but the mechanism was not such as to give control of sensitivity.

The present invention affords a device which can be set in one operation to provide both adjustments. In adjusting, the operator merely turns a disk about its axis in one or another direction from a neutral position. The direction of such turning will determine whether the instrument operates on the class-one or the class-two basis and the extent of rotation from the neutral position will determine the sensitivity ratio. In this way greater accuracy is attained than can be had where two successive adjustments must be made. Where the whole setting is made in a single operation, it can be made once and for all, whereas two successive operations are apt to be disturbing, each as to the other.

A preferred embodiment of the invention will now be described with reference to the accompanying drawings in which:

Fig. 2 is a fragmentary plan view showing the adjusting mechanism.

Fig. 3 is an exploded perspective view of the components of the adjusting mechanism.

Figure 1:
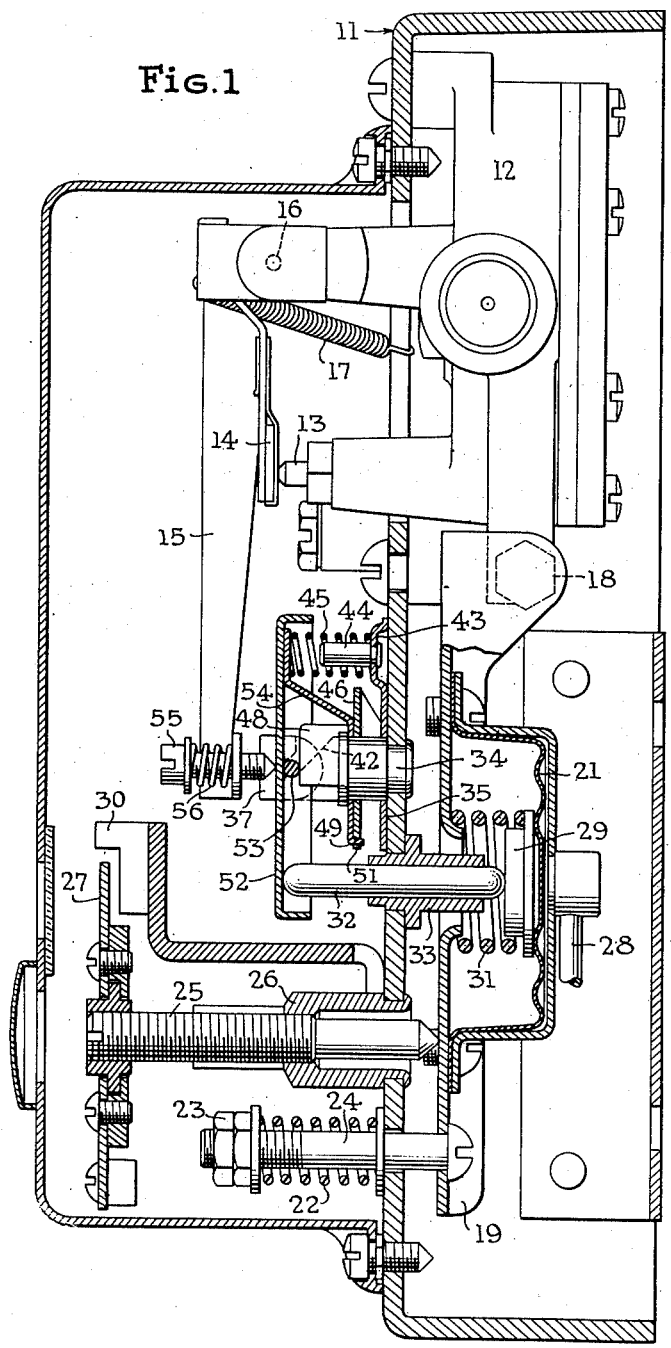
Fig. 1 is a vertical medial section of a thermostat embodying the invention, the plane of section being at 90° to the surface upon which the thermostat is intended to be mounted.

Figs. 4, 5 and 6 are similar fragmentary views all showing the face of the adjusting disk and each showing the location of the thrust rod which transmits the indications of the thermostat to the disk and the location of the follower which engages the disk and determines the position of the leak valve or equivalent control mechanism. The views show three different positions of the trunnions on which the disk tilts.

In Fig. 4 the trunnions are horizontal so that the follower is on the axis of tilt and the thermostat is neutral. Fig. 5 shows a setting in which the trunnions have been turned clockwise from the position shown in Fig. 4. This brings the push rod and follower on the same side of the trunnion axis, so that the instrument operates on the class-two basis. Fig. 6 shows the position in which the axis of the trunnion has been turned counter-clockwise from the position shown in Fig. 4. This brings the push rod and follower on opposite sides of the axis and causes the device to operate on the class-one basis.

The preferred range of motion in each direction from the neutral position is 45°, but it can be greater but never quite 90°. Above 45° the point of contact of the rather heavily loaded push rod commences to approach the trunnion axis rather rapidly and the accuracy is somewhat impaired.

As a practical matter, whether Fig. 5 represents class-two and Fig. 6 class-one, or the reverse, depends on details of design not strictly involved in the invention. It is as stated for the instrument illustrated. So far as the invention is concerned the instrument will always give one type of response if the thrust rod and feeler are on the same side of the fulcrum and the reverse type of response if they are on relatively opposite sides thereof. The extent to which the disk is rotated from the neutral position changes the relative lengths of the lever arms and in this way varies the sensitivity ratios.

Refer now to Fig. 1. 11 is the hollow-backed base or mount on which the instrument is supported and 12 represents the usual relay. A typical relay is shown in the patent to Otto et al. No. 1,500,260 dated July 8, 1924. Since these relays are common in the art and since their function is not involved in the invention, the details of construction of the relay will not be elaborated.

So far as is here material, the relay responds to a leak port 13, which is controlled by a lid or valve member 14. An arm 15 pivoted at 16 on a bracket carried by the relay 12 carries the lid 14 and is biased in a closing direction by the coil tension spring 17.

Pivoted at 18 at the lower portion of the relay 12 is a yoke 19 which carries a metal bellows 21. The yoke 19 is biased to swing clockwise (to the left as viewed in Fig. 1) by a coil compression spring 22 which reacts between the front of the base 11 and the nuts 23 fitted on the end of a bolt 24 which engages the yoke 19. Thus, the yoke 19 is spring biased forward, that is toward the base 11 and its position is determined by an adjustable thrust screw 25 which is threaded into a sleeve 26 fixed on the base 11.

By turning the screw 25 it is possible to adjust the position of the yoke 19 and thus zero the instrument. A graduated dial 27 indicates the adjustment. A stop 30 is provided to limit the adjustment to approximately one turn of the screw 25.

A capillary tube 28 transmits vapor pressure from a thermostatic bulb not shown in the drawings. This vapor pressure acts within the bellows 21 and forces the bellows forward against a flanged thrust button 29. A loading spring 31 reacts against the flange of the button 29 and urges the bellows rearward, i. e., in opposition to the vapor pressure transmitted through the capillary 28.

Thrust button 29 reacts against the push rod 32 which is guided in a sleeve 33 mounted in the base 11. The parts numbered 31 and below represent merely one environment in which the invention may be used. The widest range of equivalents is available for these parts, since they are not features of the invention.

Refer now particularly to Figs. 2 and 3, in addition to Fig. 1. A headed stud or journal member 34 is fixed on the forward side of the base plate 11 vertically above the push rod 32, the axes of the journal and push rod being parallel. Swiveled on the journal 34 is a yoke 35 which has horizontal arms extending in opposite directions from the axis of the journal 34 and terminating in substantially parallel forwardly projecting extensions 36 and 37. Extension 36 carries a leaf spring 38 which overlies a hole 39 which serves as a trunnion bearing. Extension 37 has an end portion 41 which is folded outward and back to lap an inclined notch 42, a portion of which also serves as a trunnion bearing.

In addition the yoke 35 carries an upstanding arm 43 at the upper end of which there is a stud 44 which centers and serves as a seat for a coil compression spring 45. Also mounted on the journal 34 and retained by the terminal flange are two reversely bowed members, a rear bow spring 46 which has end lugs 47 which engage the upper portion of the extensions 36 and 37 and hold the bow spring against rotary motion relatively to the yoke 35, and a forward bowed follower member 48 which is prevented from rotation relatively to the member 46 by a lug 49 which engages in a notch 51 formed therein to receive it.

The spring 46 causes follower 48 to engage the trunnion bar 53 which is inserted through the circular peripheral flange of disk 52 in such position that its axis is close to and parallel with the front face of the disk 52. Bar 53 is fixed in place by solder or other convenient means. The ends of the trunnion bar 53 are received, one in the opening 39, and the other in the end of the notch 42. The ends of the bowed follower member 48 engage the bar and force it into engagement with the trunnion bearings 39, 42 as is clearly shown in Figs. 1 and 2.

Member 48 carries a flexible finger 54 which, as best shown in Fig. 1, engages the rear face of disk 52 within the flange and serves as the forward seat for spring 45. Thus spring 45 reacts to tilt the disk on the trunnions in frame 35, and hold it against push rod 32.

Since the push rod 32 has its axis vertically below the axis of the journal 34, the forward end of the push rod engages the rear face of the disk 52 near its lowermost point. The arm 15 carries a follower screw 55 which engages the disk substantially at its leftmost point. The significant thing is that these two points of engagement are displaced approximately 90° of arc, measured on the periphery of the disk. Ninety degrees is the optimum spacing, for reasons which will be explained.

A friction spring 56 is provided to retain the adjustment of the screw 55. The yoke 35 can be swiveled on the journal 34 through an angle preferably totalling 90°. Fig. 4 shows the neutral position in which the trunnion axis 53 is horizontal. In this position longitudinal motion of the push rod 32 will tilt the disk but no motion will be transmitted to arm 15 because the point of the follower screw 55 is directly over the axis of the trunnion bar 53.

If the yoke 35 be turned clockwise from the position just mentioned, the point of contact of push rod 32 with the disk and the point of contact of the end of screw 55 with the disk will both be on the same side of the axis of the trunnion 53. Thus, if push rod 32 moves forward, screw 55 must move forward. The ratio of their forward movements will depend on the extent to which the trunnions 53 have been turned from the horizontal position of Fig. 4.

If the yoke 35 be rotated counter-clockwise from the neutral position, the axis of the trunnions 53 will take the relative positions shown in Fig. 6 so that the point of contact of push rod 32 is on the opposite side of the trunnion axis from the point of contact of the screw 55. Consequently, if the rod 32 moves forward, the lever 15 will move rearward.

To sum up, Fig. 4 shows a neutral position. Fig. 5 shows a position of high sensitivity for one class of operation and Fig. 6 shows a setting of high sensitivity for the other class of operation.

It will be obvious without detailed explanation that if the disk be turned toward the position of Fig. 4 from either the position of Fig. 5 or the position of Fig. 6, the effect will be to reduce the extent of motion of the screw 54 produced by a given motion of the push rod 32.

From the construction above outlined, it will be apparent that it is possible merely by turning the yoke 35 on the journal 34, to make a progressive adjustment of the instrument between maximum sensitivity, class-one, and maximum sensitivity, class-two. In all intermediate positions the sensitivity is less and becomes progressively less for each class as the position of Fig. 4 is approached.

Another way of explaining it is to say that starting with the parts in the neutral position of Fig. 4, which gives zero sensitivity, the sensitivity can be progressively increased for either type of operation by turning the parts either toward the position of Fig. 5 or the position of Fig. 6.

In support of the statement that 90° spacing of the two contact points is the optimum, attention is called to the fact that the angle must be more than 0° and less than 180° to meet the requirement if one but not both points are to move across the center line of the trunnion axis as this is oriented. A spacing of 90° gives symmetry of adjustments made reversely from the neutral position of Fig. 4, and also affords the maximum practicable change of sensitvity in each direction. Hence the 90° spacing is preferred although the basic result can be had with spacings which are greater or less by a reasonable amount.

I claim:

1. In a sensitivity adjusting device, the combination of a support rotatable about a geometric axis; a trunnion bearing mounted on said support with its axis intersecting said geometric axis at 90°; a plate-like reactor tiltable on said trunnion bearing within a range of positions approximating the position in which it is normal to said geometric axis; a push rod in thrust engagement with a face of the reactor and adapted to be shifted by a responsive element; a follower in thrust engagement with a face of the reactor and adapted to actuate a controller; and yielding means maintaining engagement between the push rod, reactor and follower, the points of engagement being similarly spaced radially from said geometrical axis and being angularly spaced from each other about said axis by an angle of substantially more than zero degrees and substantially less than 180°, the parts being so arranged that the support and reactor may be rotated within a range which carries one but not both points of contact from one to the other side of the trunnion axis and simultaneously changes the distance of each therefrom, whereby the transmitted motion may be reversed and the effective leverage ratio may be progressively varied on opposite sides of the point of reversal.

2. The combination defined in claim 1 in which the points of contact are at equal radial distances from the geometrical axis and the angular spacing is 90°.

3. The combination defined in claim 1 in which the points of contact are at equal radial distances from the geometrical axis and the angular spacing is 90° and the support may be rotated at least 45° in each direction from a neutral position in which the contact point of the follower is at the trunnion axis.

4. The combination defined in claim 1 in which the reactor is a thin rigid plate and the push rod and follower engage opposite faces thereof.

5. The combination defined in claim 1 in which the reactor is a thin rigid plate, the push rod and follower engage opposite faces thereof and said yielding means include a spring which engages the plate and tends to tilt it on the trunnion bearing until arrested by engagement with the push rod.

6. In a sensitivity adjusting device the combination of a supporting base; a two-armed bearing-carrying yoke rotatably mounted on said base to turn about a geometric axis; a rigid disk having trunnion journals engaging bearings in the arms of the yoke, the parts being so proportioned and arranged that the disk is tiltable on an axis which intersects and is normal to said geometrical axis; a push rod guided in said base, adapted to be axially shifted in a direction parallel with said geometrical axis by a responsive element and entering into thrust engagement with said disk; yielding means for maintaining said engagement; a follower adapted to actuate a controller, also in thrust engagement with said disk; and yielding means for maintaining the last named engagement, the points of engagement of the push rod and follower with the disk being spaced from said geometrical axes by equal radial distances and spaced 90° angularly about said geometrical axis.

7. The combination defined in claim 6 in which the trunnions are removable from the bearings in the yoke and spring means are interposed between the trunnions and the yoke and serve to retain the trunnions in the bearings and develop frictional resistance to turning of the yoke on said base.

OTTO SCHARPF.

No references cited.